United States Patent
Dille

(10) Patent No.: US 9,297,375 B1
(45) Date of Patent: *Mar. 29, 2016

(54) FLUID CYLINDER BLOCK HAVING A STRESS DISTRIBUTING JOINT

(71) Applicant: FORUM US, INC., Houston, TX (US)

(72) Inventor: Mark C. Dille, Houston, TX (US)

(73) Assignee: Forum US, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,381

(22) Filed: Dec. 12, 2014

(51) Int. Cl.
 *F04B 39/10* (2006.01)
 *F04B 53/00* (2006.01)
 *F15B 15/14* (2006.01)

(52) U.S. Cl.
 CPC ........... *F04B 53/007* (2013.01); *F15B 15/1433* (2013.01)

(58) Field of Classification Search
 CPC ....... F04B 1/0421; F04B 53/007; F16J 10/00; F15B 15/1433; F15B 15/1428
 USPC .......................................... 417/568
 See application file for complete search history.

(56) References Cited

U.S. PATENT DOCUMENTS

| | | | |
|---|---|---|---|
| 3,527,550 A * | 9/1970 | Flynn et al. | 417/383 |
| 7,513,759 B1 * | 4/2009 | Blume | 417/568 |
| 8,092,198 B2 * | 1/2012 | Kobayashi et al. | 417/559 |
| 8,317,498 B2 * | 11/2012 | Gambier et al. | 417/454 |
| 8,506,262 B2 * | 8/2013 | Leugemors et al. | 417/298 |
| 8,784,081 B1 * | 7/2014 | Blume | 417/568 |
| 2008/0000065 A1 * | 1/2008 | Ganguly | F04B 53/162 29/421.1 |
| 2009/0081034 A1 * | 3/2009 | Gambier | F04B 17/05 415/200 |
| 2011/0206547 A1 * | 8/2011 | Kim et al. | 417/568 |
| 2012/0063936 A1 * | 3/2012 | Baxter et al. | 417/415 |
| 2012/0213651 A1 * | 8/2012 | Ochoa | F04B 53/007 417/437 |
| 2012/0288387 A1 | 11/2012 | Freed et al. | |

OTHER PUBLICATIONS

Vangard Technologies; The Dawn of a New Era in Fluid End Design; 8 total pages; date unknown.

* cited by examiner

*Primary Examiner* — Charles Freay
(74) *Attorney, Agent, or Firm* — Patterson & Sheridan, LLP

(57) ABSTRACT

A fluid cylinder block includes a body having a plurality of bores formed therein that intersect at a junction, and a stress distributing joint comprising a groove formed in the body adjacent opposing bores of the plurality of bores on each side of the junction, wherein the grooves include a major dimension that is greater than a diameter of the opposing bores.

19 Claims, 8 Drawing Sheets

FLUID CYLINDER BLOCK HAVING A STRESS DISTRIBUTING JOINT

BACKGROUND OF THE INVENTION

1. Field

Embodiments of the disclosure generally relate to fluid cylinder blocks that are utilized in pressurized fluid delivery systems to transfer high volumes of fluids at extreme pressures and, in particular, to a fluid cylinder block having one or more stress distributing joints.

2. Description of the Related Art

Pressurized fluid delivery systems which include fluid cylinder blocks for transferring fluids at high pressures are used in multiple industries. One example where such systems are used includes the oil and gas industry where high pressure fluid reciprocating pumps, such as multiplex plunger pumps, are commonly used. These types of pumps have a fluid end that includes valves, pistons, liners, among other components, that are driven by a power end that converts the rotation of a drive shaft to the reciprocating motion of the pistons in the fluid end. The fluid end typically includes a fluid cylinder block having at least three bores that intersect at a junction, and at least two of the bores share a common axis. The pumps facilitate pumping at rates of up to 100 bbl/minute, and are capable of creating variable pressures, e.g., between negative pressures during suction to a discharge pressure of about 1,000 pounds per square inch (psi), or more. This variable pressure may occur at frequent intervals (e.g., about every fifth of a second for a pump operating at 300 strokes per minute). The fluid end of the fluid cylinder blocks frequently has a short service life as the oscillating pressures cause the fluid cylinder block to crack and fail due to cyclic fatigue stress.

Numerous attempts to alleviate stresses in fluid cylinder blocks have been attempted. One such attempt includes completely offsetting the axis of one bore relative to the axis of other bores. However, completely offsetting the bores creates less than ideal flow dynamics in the fluid end. Complete offsetting also complicates servicing of the fluid end since internal valves and other internal components are accessed via the inside of the bores. Thus, introducing additional bends or turns between bores complicates servicing. In addition, offsetting the bores may minimize use of standard internal components resulting in manufacture and/or purchase of customized components. This increases the cost of the fluid end considerably.

Therefore, there exists a need for a fluid cylinder block that resists stresses.

SUMMARY

It is therefore an object of the disclosure to provide a fluid cylinder block having one or more stress distributing joints.

In one embodiment, a fluid cylinder block is provided. The fluid cylinder block includes a body having a plurality of bores formed therein that intersect at a junction, and a stress distributing joint comprising a groove formed in the body adjacent opposing bores of the plurality of bores on each side of the junction, wherein the grooves include a major dimension that is greater than a diameter of the opposing bores.

In another embodiment, a fluid end is provided. The fluid end includes a body having a plurality of bores formed therein that intersect at a junction, a stress distributing joint comprising a groove formed in the body in a first bore of the plurality of bores, wherein the groove includes a major dimension that is greater than a diameter of each of the plurality of bores, and a plunger disposed in one of the plurality of bores.

In another embodiment, a fluid end is provided. The fluid end includes a body having a plurality of bores formed therein that intersect at a junction, a stress distributing joint which includes a groove formed in the body adjacent opposing bores of the plurality of bores on each side of the junction, wherein the grooves include a major dimension that is greater than a diameter of the opposing bores, and a plunger disposed in one of the plurality of bores.

BRIEF DESCRIPTION OF THE DRAWINGS

Having generally described the various embodiments of the disclosure, reference will now be made to the accompanying drawings.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the invention provide a fluid cylinder block for use in a pressurized fluid delivery system having one or more stress distributing joints. The stress distributing joint (s) of the fluid cylinder block are utilized to reduce stresses in certain portions of the fluid cylinder block relative to fluid cylinder blocks without such joints. The fluid cylinder blocks as described herein may be less expensive to construct than prior art fluid cylinder blocks because less material is used, and existing standard internal components, such as valves, valve seats, plungers, and the like, may be used. Additionally, the fluid cylinder block includes opposing bores that share a common axis, which optimizes fluid dynamics and enhances servicing by personnel. Furthermore, many existing fluid cylinder blocks may be refurbished to include stress distributing joints as described herein.

Figure 1A:
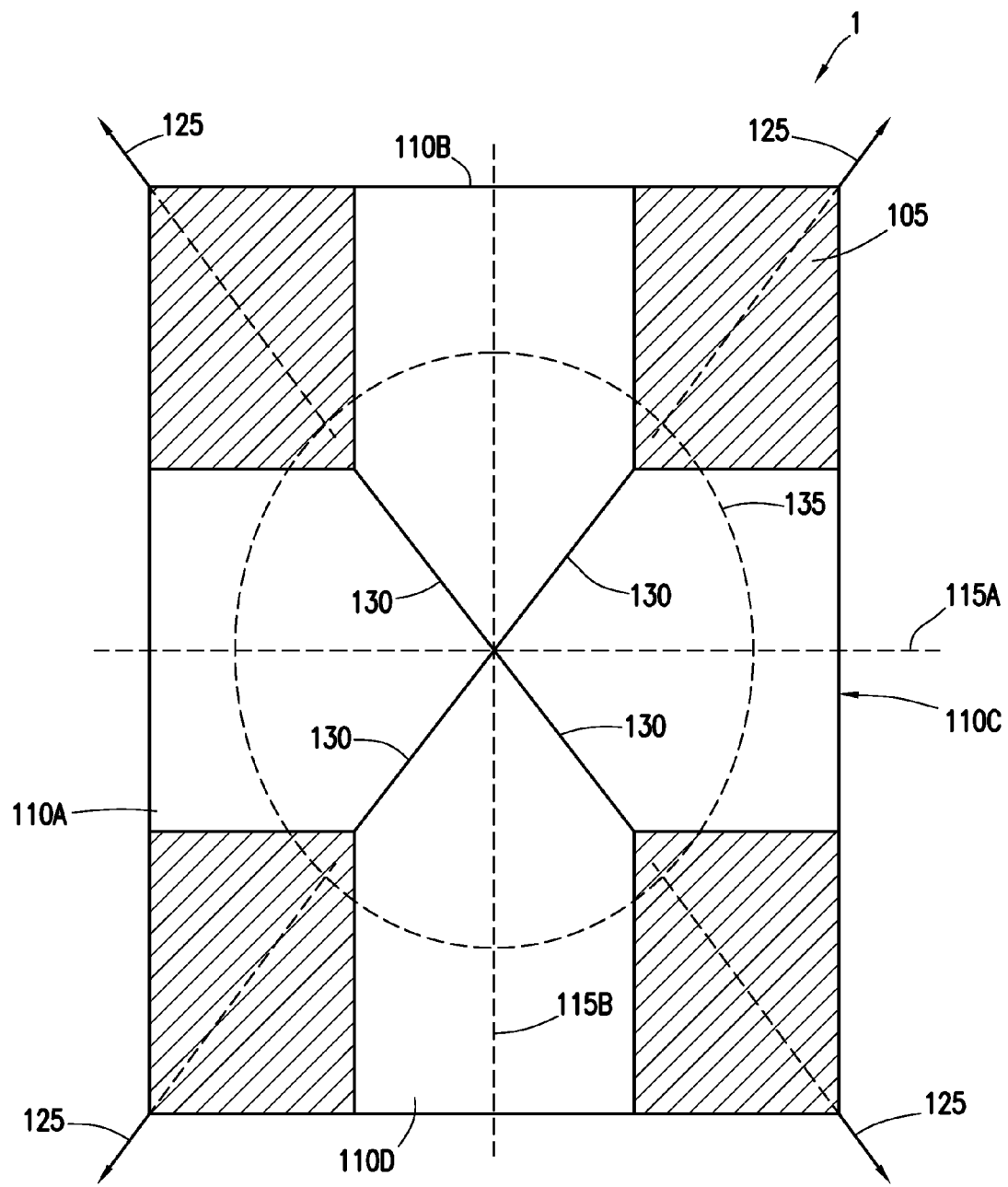
FIG. 1A is a schematic side cross-sectional view of a fluid cylinder block that may be used for transferring fluids at high pressures.

FIG. 1A is a schematic side cross-sectional view of a fluid cylinder block 1 that may be used for transferring fluids at high pressures (e.g., at pressures of about 1,000 pounds per square inch (psi), or greater). The fluid cylinder block 1 includes a body 105 that may be a solid monolithic body made of a metallic material. The body 105 includes bores 110A-110D formed therein for transferring fluids. Opposing bores 110A and 110C are formed along a common axis 115A and opposing bores 110B and 110D share a common axis 115B. The common axes 115A and 115B may include a deviation up to about +/−2 inches when forming the bores 110A-110D, but axes of the bores 110A-110D are generally within about +/−0.1 inches, or less. One or more of the bores 110A-110D may be an inlet or an outlet, and may include a seat for internal components, such as valves, valve seats, a plunger, and the like.

When fluid is provided in the bores 110A-110D at high pressures, a load path, indicated by dashed lines 125, is formed in the body 105 of the fluid cylinder block 1. The load paths 125 are generally coplanar with intersections 130 of the bores 110A-110D and extend outwardly therefrom. The intersection 130 of each bore 110A-110D therefore forms a junction 135 where internal stresses induced by pressurized fluids may cause cracks (not shown) in the body 105. The cracks generally form at the least flexible locations for the junction along intersections 130 which generally terminate at the four points where intersections 130 cross the section plane of body 105, causing the fluid cylinder block 100 to fail.

Figure 1B:
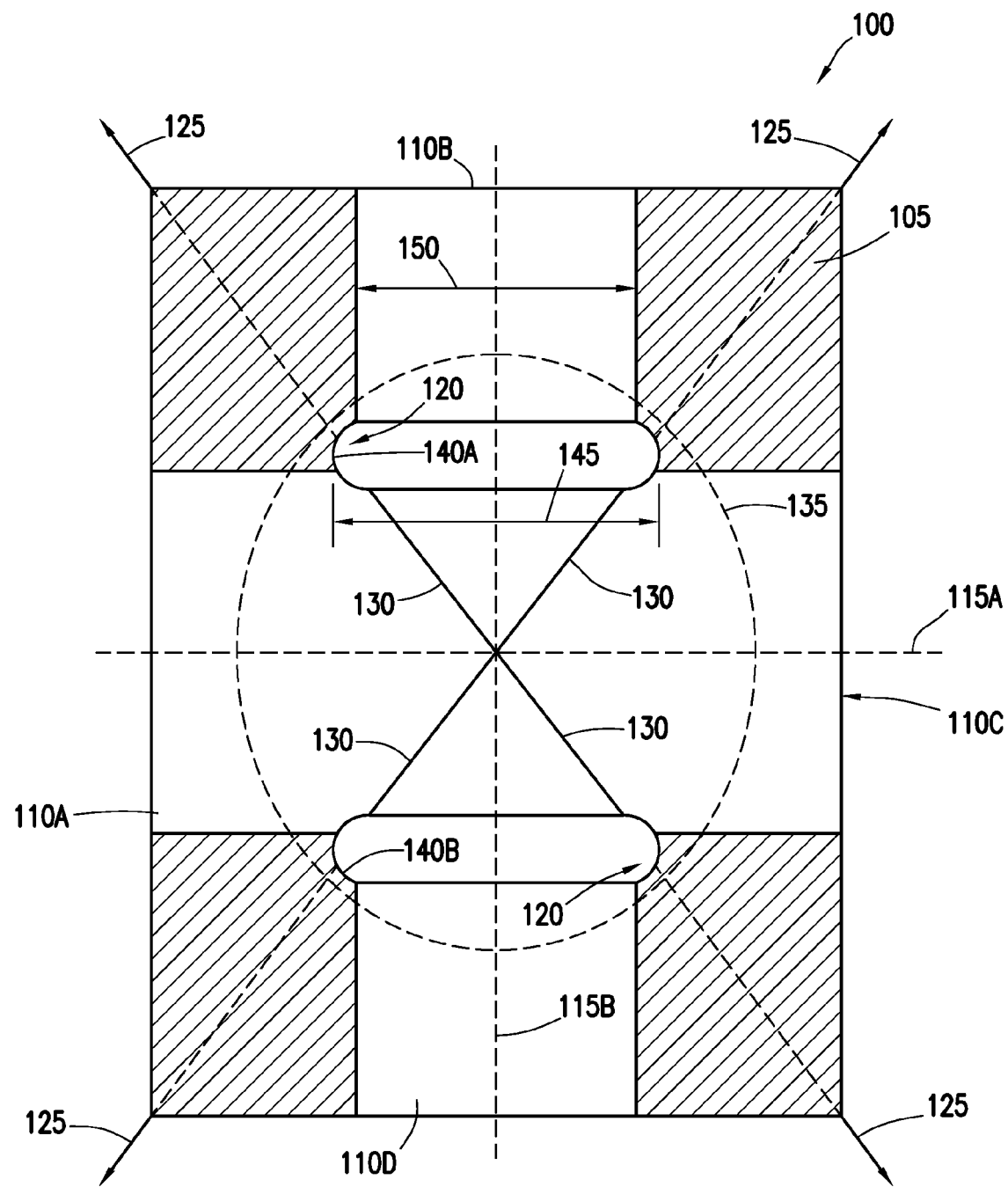
FIG. 1B is a side cross-sectional view of one embodiment of a fluid cylinder block for transferring fluids at high pressures.

FIG. 1B is a side cross-sectional view of one embodiment of a fluid cylinder block 100 for transferring fluids at high pressures according to embodiments described herein. The fluid cylinder block 100 includes a stress distributing joint 120 formed in at least a portion of the bores 110A-110D. In this embodiment, the stress distributing joint 120 is shown on opposing bores 110B and 110D but may alternatively be included with the opposing bores 110A and 110C, or on just one of the bores 110A, 110B, 110C or 110D. For example, the stress distributing joint 120 may be included only on the upper portion of the fluid cylinder block 100 (adjacent the bores 110A, 110B and 110C) and not in the opposing bore 110D. In this scenario, the fluid cylinder block 100 may fail along the load paths 125 between the bores 110A, 110D and 110C. In some instances, the bore 110D may represent a low pressure side of the fluid cylinder block 100 where a crack from fatigue stress may be preferred (as opposed to the high pressure side of the fluid cylinder block 100 (e.g., the bore 110B)). However, in order to extend the lifetime of the fluid cylinder block 100, the stress distributing joint 120 may be utilized in at least two of the bores 110A-110D which may eliminate or prolong the development of a crack from fatigue stress in the fluid cylinder block 100.

Each stress distributing joint 120 is utilized to smooth or redistribute the load along the load paths 125. Each stress distributing joint 120 may include a groove 140A and 140B formed in the body 105 adjacent an end of each of the bores 110B and 110D. At least a portion of the grooves 140A and 140B may be formed at least partially in each of the bores 110A and 110C. The grooves 140A and 140B include a major dimension 145 (which may be an inside diameter) that is greater than an inside diameter 150 of each of the bores 110B and 110D. Each of the grooves 140A and 140B are formed by removing more material from the body 105 at the junction 135 which reduces stress in the body 105. In some embodiments, the groove 140A may include the major dimension 145 that is larger than a major dimension of the groove 140B.

In conventional fluid cylinder blocks, the stress distributing joint 120 is not present such that the bores 110A-110D intersect and form generally sharp corners in the body 105 at the junction 135 (e.g., along the intersections 130). In the conventional fluid cylinder blocks, the load path 125 runs generally linearly along the intersections 130 as shown, as well as at or near the corners where the bores 110A-110D end (see FIG. 1A). However, in utilizing the grooves 140A and 140B, the load path 125 is not linear, at least at portions of the body 105 adjacent the grooves 140A and 140B.

Figure 2:
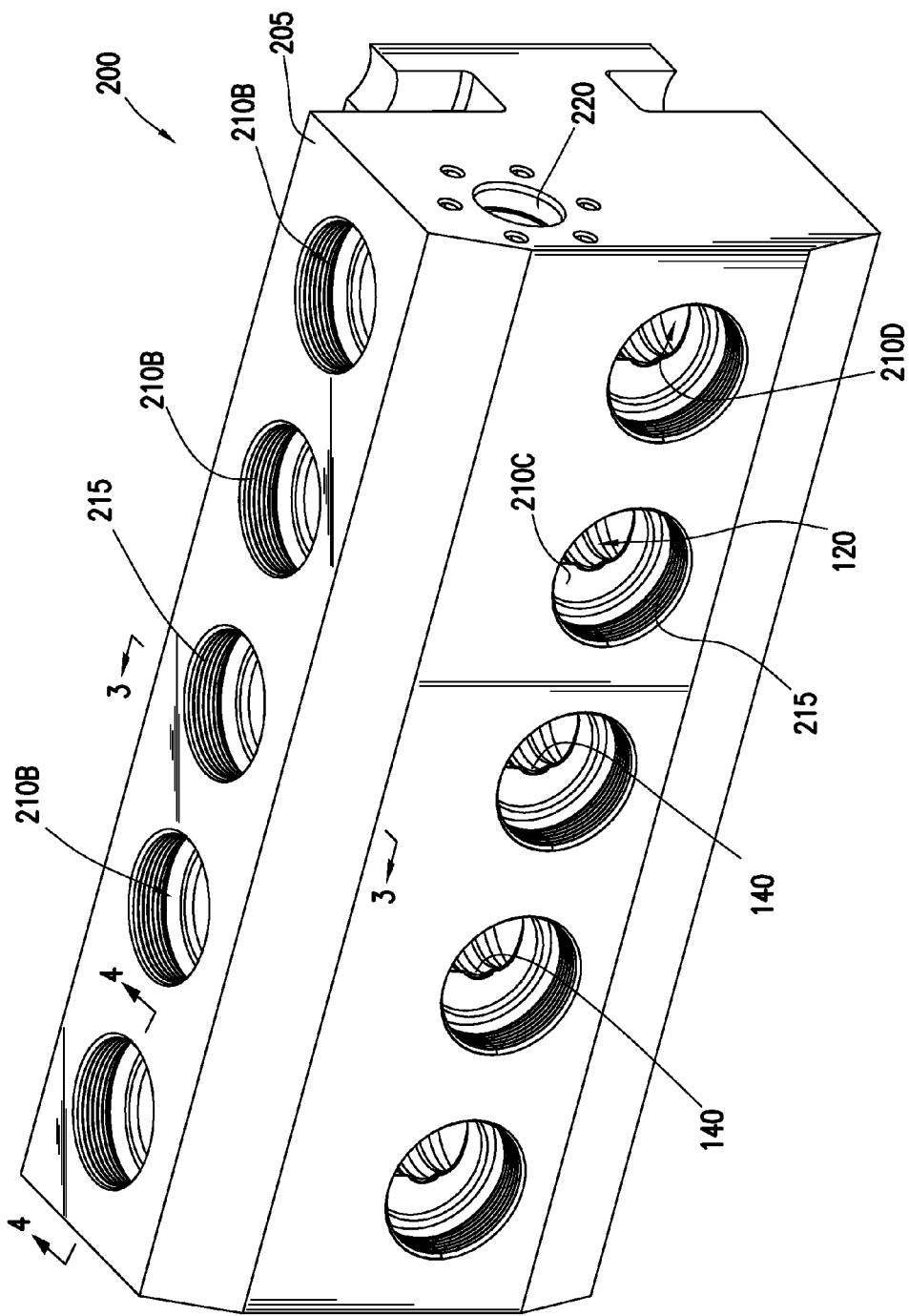
FIG. 2 is an isometric view of one example of a fluid cylinder block for a fluid end having a stress distributing joint as described herein.

FIG. 2 is an isometric view of one example of a fluid cylinder block 200 for a fluid end having the stress distributing joint 120 as described herein. The fluid cylinder block 200 shown in FIG. 2 does not include internal and/or external components coupled thereto in order to show details of the stress distributing joint 120.

The fluid cylinder block 200 includes a body 205 that may be substantially similar to the body 105 described in FIG. 1. The body 205 includes a plurality of bores 210A-210D (bore 210A is not seen in this view) that are similar to the bores 110A-110D described in FIG. 1. However, each of the bores 210A-210D include mating interfaces 215 for coupling with internal and/or external components, such as valves, valve seats, plungers, gauges, cover nuts, and the like. The body 205 may also include a discharge manifold 220 formed therein that is in selective communication with at least a portion of the bores 210B.

Figure 3:
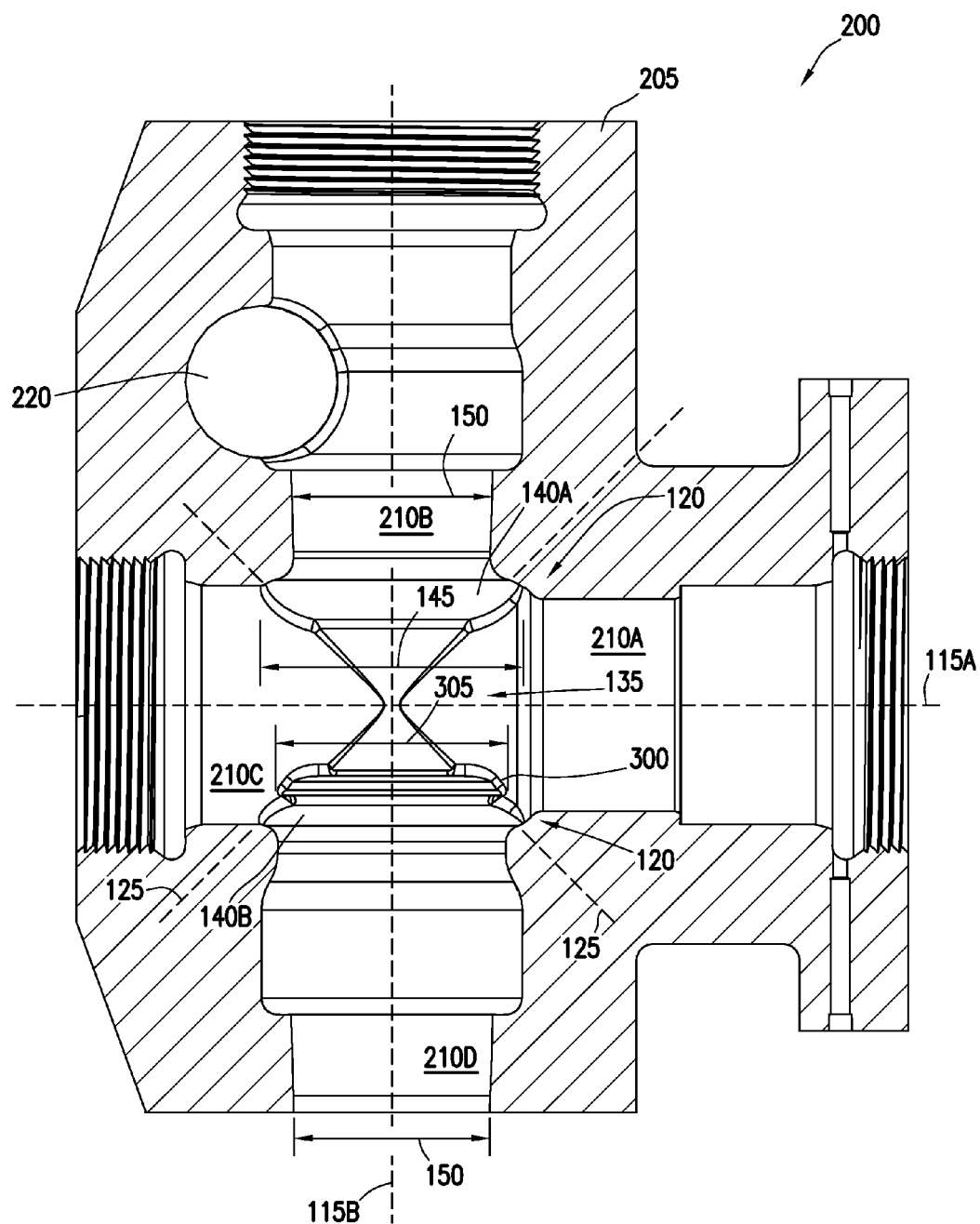
FIG. 3 is a cross-sectional view of the fluid cylinder block along lines 3-3 of FIG. 2.

FIG. 3 is a cross-sectional view of the fluid cylinder block 200 along lines 3-3 of FIG. 2. Similar to the fluid cylinder block 100 described and shown in FIG. 1, the fluid cylinder block 200 includes opposing bores 210A and 210C and opposing bores 210B and 210D. The opposing bores 210A and 210C are formed along a common axis 115A and opposing bores 210B and 210D share a common axis 115B similar to the fluid cylinder block 100 of FIG. 1B. The fluid cylinder block 200 also includes the junction 135 and a stress distributing joint 120 at the junction 135.

Each stress distributing joint 120 includes a groove 140A and 140B formed in the body 205 adjacent an end of each of the bores 210B and 210D, respectively. At least a portion of the grooves 140A and 140B may be formed at least partially in each of the bores 210A and 210C. The grooves 140A and 140B include a major dimension 145 (only one is shown with the groove 140A) that is greater than an inside diameter 150 of each of the bores 210B and 210D. In addition to the grooves 140A and 140B, in some embodiments, the fluid cylinder block 200 may also include a valve stop groove 300 formed adjacent the groove 140B in or near the bore 210D. The valve stop groove 300 may include a major dimension 305 (which may be a diameter) that is greater than the inside diameter 150 of the bore 210D and greater than the major dimension 145 of the groove 140B.

Figure 4:
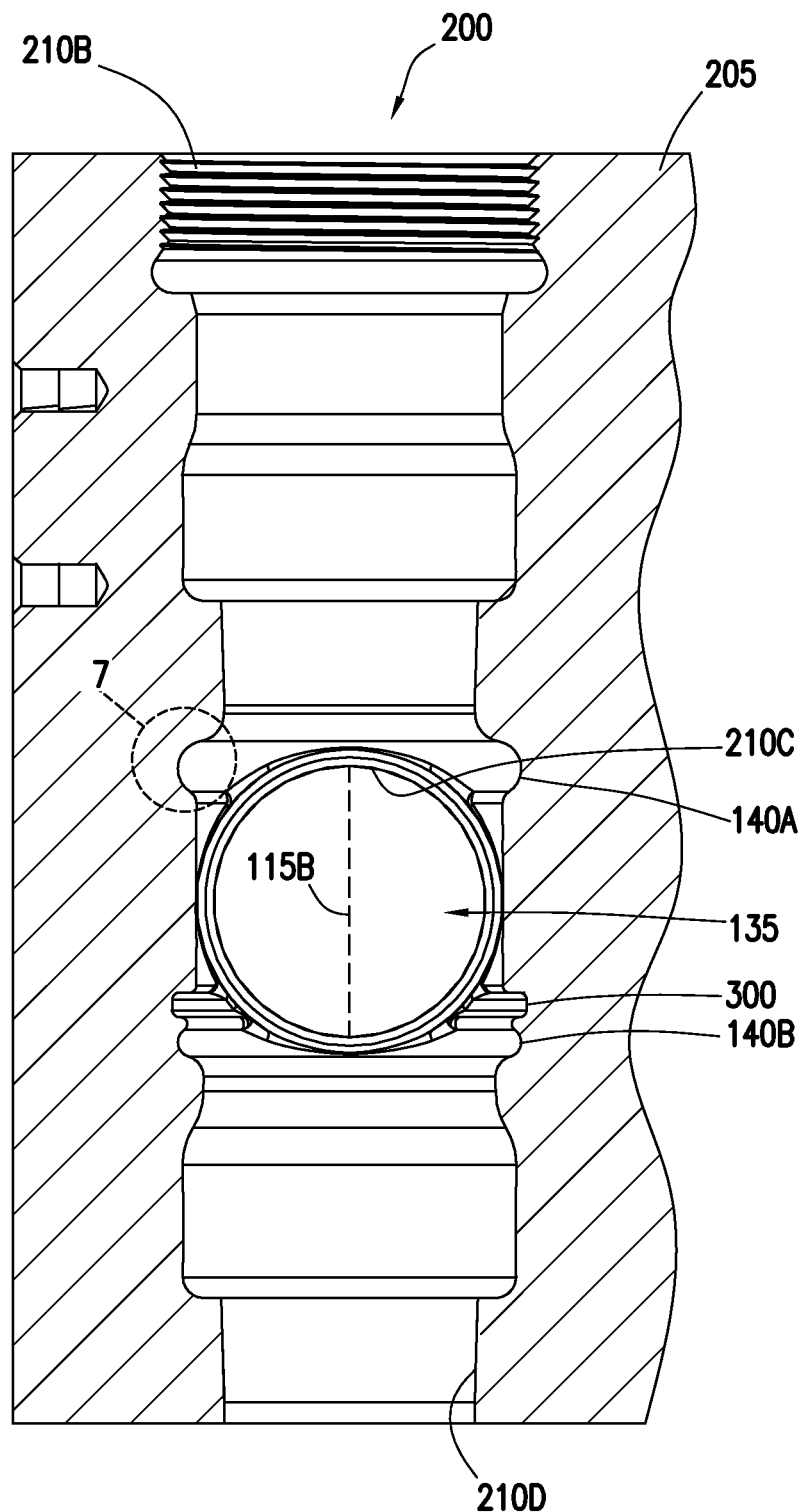
FIG. 4 is a cross-sectional view of the fluid cylinder block along lines 4-4 of FIG. 2.

FIG. 4 is a cross-sectional view of the fluid cylinder block 200 along lines 4-4 of FIG. 2. The grooves 140A and 140B of the stress distributing joint 120 as well as the valve stop groove 300 are shown formed in the body 205 at the junction 135. As explained above with the fluid cylinder block 100, the junction 135 includes the load paths 125. However, the stress distributing joints 120 are utilized to smooth or redistribute the load along the load paths 125, which reduces stress on the body 205 and may extend the lifetime of the fluid cylinder block 200.

Figure 5:
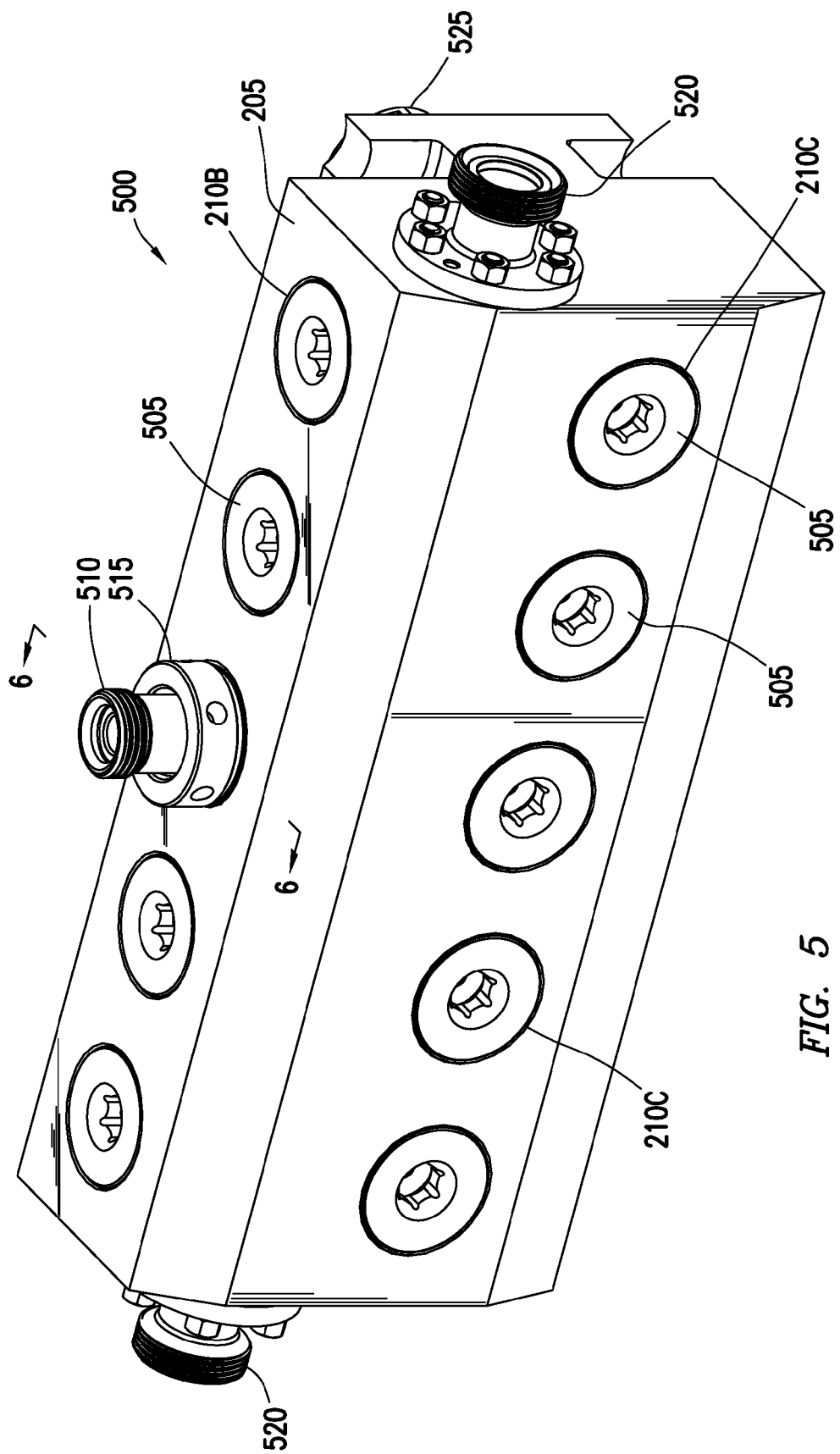
FIG. 5 is an isometric view of a fluid end having the fluid cylinder block 200 with the stress distributing joint 120 as described herein.

FIG. 5 is an isometric view of a fluid end 500 having the fluid cylinder block 200 with the stress distributing joint 120 as described herein. The fluid end 500 includes bores 210A-210D (210A and 210D are not shown in this view) formed in a body 205 similar to the fluid cylinder block 200 shown in FIG. 2. However, in this embodiment, internal and external components are shown coupled to the body 205.

The fluid end 500 includes cover nuts 505 disposed in at least a portion of the bores 210B and 210C. A gauge connector 510 may be coupled to one of the bores 210B by a gauge connector nut 515. A discharge flange 520 may be coupled to opposing ends of the body 205 for connecting hoses with the discharge manifold 220 (shown in FIG. 2). A pony rod clamp 525 may be coupled to the bore 210A (not shown in this view).

Figure 6:
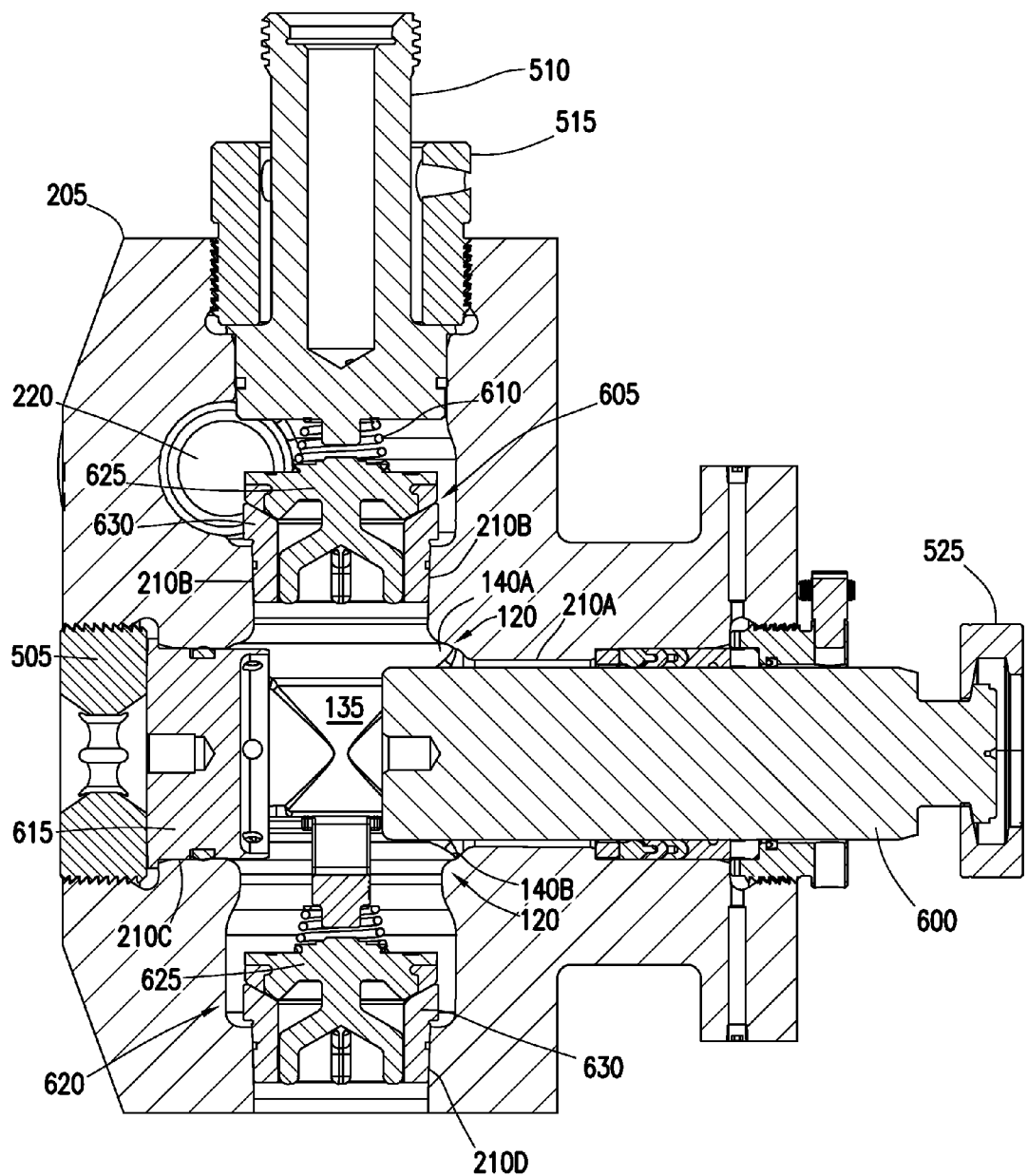
FIG. 6 is a cross-sectional view of the fluid end along lines 6-6 of FIG. 5.

FIG. 6 is a cross-sectional view of the fluid end 500 along lines 6-6 of FIG. 5. The grooves 140A and 140B of the stress distributing joint 120 are shown formed in the body 205 at the junction 135. The valve stop groove 300 (shown in FIG. 3) is not shown in this view due to position of the internal components. Additionally, a plunger 600 is shown disposed in the bore 210A and a valve assembly 605 having a spring 610 is shown disposed in the bore 210B. A suction cover seal gland 615 is shown disposed in the bore 210C and a valve stop 620 is shown in bare 210D. A valve body 625 as well as a valve seat 630 may also be disposed in the bores 210B and 210D.

Figure 7:
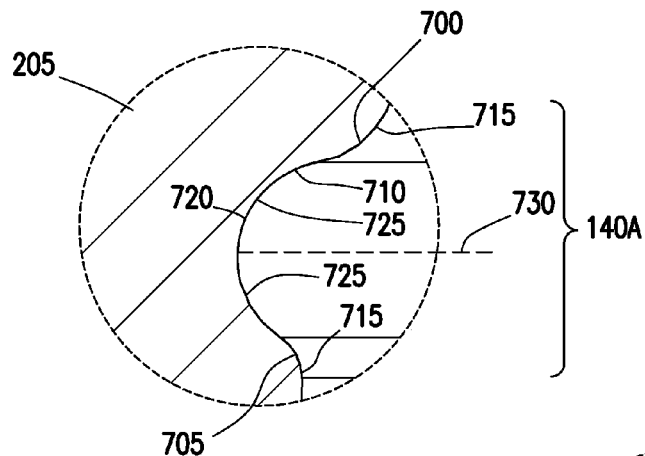
FIG. 7 is an enlarged partial cross-sectional view of the groove shown in FIG. 4.

FIG. 7 is an enlarged partial cross-sectional view of the groove 140A shown in FIG. 4. The groove 140A may include a first radius 700 and a second radius 705 surrounding an intermediate radius 710. The intermediate radius 710 may be larger than both of the first radius 700 and the second radius 705. Thus, the intermediate radius 710 may comprise a major radius while the first radius 700 and the second radius 705 may comprise a minor radius. In addition, the first radius 700 and the second radius 705 may include a concave surface 715 with respect to the common axis 115B (shown in FIG. 4) while the intermediate radius 710 includes a convex surface 720 relative to the common axis 115B (shown in FIG. 4). In some embodiments, the intermediate radius 710 includes curved surfaces 725 that are symmetrical relative to a centerline 730 of the groove 140A. In embodiments where two grooves 140A and 140B are used in the fluid cylinder block 200, the grooves 140A and 140B may be constructed the same as the groove 140A shown in FIG. 7. However, in some embodiments, the dimensions of one or all of the first radius 700, the second radius 705 and the intermediate radius 710 of the groove 140A may be greater than or less that of the groove 140B. The dimensional differences may be based on differences in the major dimension 145 (shown in FIG. 3) of the grooves 140A and 140B.

Figure 8A:
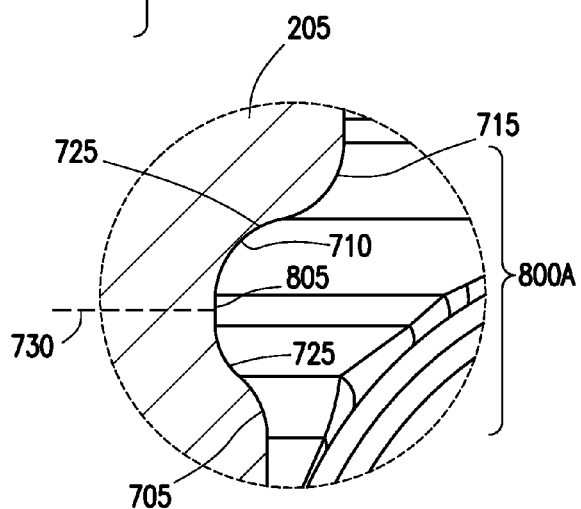
FIGS. 8A and 8B are enlarged partial cross-sectional views of alternative embodiments of a groove, which may be used as the groove shown in FIG. 4.
Figure 8B:
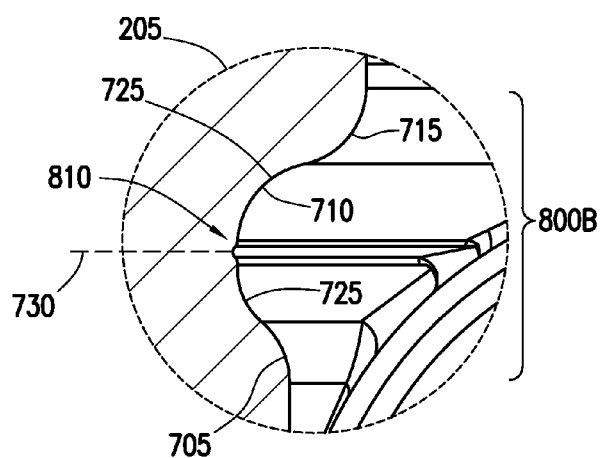

FIGS. 8A and 8B are enlarged partial cross-sectional views of alternative embodiments of a groove 800A and 800B, respectively, which may be used as the groove 140A (and/or the groove 140B) shown in FIG. 4. The groove 800 according to FIG. 8A includes a first radius 700 and a second radius 705 surrounding an intermediate radius 710, similar to the embodiment shown in FIG. 7. However, in this embodiment, a flat section 805 separates the intermediate radius 710. The flat section 805 may be formed along the centerline 730 of the groove 800A.

The groove 800B according to FIG. 8B is similar to the groove 800A shown in FIG. 8A with the exception of an interface 810 in between the curved surfaces 725 of the intermediate radius 710. The interface 810 may extend radially away from the common axis 115B (shown in FIG. 4).

Embodiments of the stress distributing joint 120 as described herein reduces stress at the junction 135 (shown in FIGS. 1A, 1B, 3, 4 and 6) by about 20%. Utilization of the grooves 140A and/or 140B smooth or redistribute pressure induced loading along load paths of the body of a fluid cylinder block as disclosed herein. Each of the grooves 140A and 140B are formed by removing more material from the body at the junction where bores formed in the body intersect, which reduces stress in the body of the fluid cylinder block. This may increase the usable lifetime of the fluid cylinder block, which reduces costs.

While the foregoing is directed to embodiments of the present disclosure, other and further embodiments of the disclosure thus may be devised without departing from the basic scope thereof, and the scope thereof is determined by the claims that follow.

The invention claimed is:

1. A fluid cylinder block, comprising:
   a body having a plurality of bores formed therein that extend into and intersect at a junction; and
   a first stress distributing joint and a second stress distributing joint positioned in opposing bores of the plurality of bores, each of the stress distributing joints comprising a circumferential groove formed in the body, wherein the groove includes a major dimension that is greater than a diameter of a portion of the opposing bores extending into the junction.

2. The fluid cylinder block of claim 1, wherein the fluid cylinder block comprises a fluid end.

3. The fluid cylinder block of claim 2, wherein one or more of the plurality of bores includes a mating interface.

4. The fluid cylinder block of claim 2, further comprising a plunger disposed in one of the plurality of bores.

5. The fluid cylinder block of claim 2, further comprising a valve and a valve seat disposed in one of the plurality of bores.

6. The fluid cylinder block of claim 1, wherein at least one of the grooves comprises a first radius and a second radius surrounding an intermediate radius.

7. The fluid cylinder block of claim 6, wherein the intermediate radius is symmetrical relative to a centerline of the groove.

8. The fluid cylinder block of claim 6, wherein a flat portion separates the intermediate radius along a centerline of the groove.

9. The fluid cylinder block of claim 6, wherein at least one of the grooves includes an interface that extends away from a common axis of the opposing bores.

10. A fluid end, comprising:
    a body having a plurality of bores formed therein that extend into and intersect at a junction;
    a first stress distributing joint and a second stress distributing joint positioned in opposing bores of the plurality of bores, each of the stress distributing joints comprising a circumferential groove formed in the body, wherein the groove includes a major dimension that is greater than a diameter of a portion of the opposing bores extending into the junction; and
    a plunger disposed in one of the plurality of bores.

11. The fluid end of claim 10, wherein at least one of the grooves comprises a first radius and a second radius surrounding an intermediate radius.

12. The fluid end of claim 11, wherein the intermediate radius is symmetrical relative to a centerline of the groove.

13. The fluid end of claim 11, wherein a flat portion separates the intermediate radius along a centerline of the groove.

14. The fluid end of claim 11, wherein at least one of the grooves includes an interface that extends away from a common axis of the opposing bores.

15. A fluid end, comprising:
    a body having a plurality of bores formed therein that extend into and intersect at a junction;
    a stress distributing joint formed in each of a first bore of the plurality of bores and a second bore of the plurality of bores opposing the first bore, each stress distributing joint including a circumferential groove formed in the body on each side of the junction, wherein each groove includes a major dimension that is greater than a diameter of a portion of the first bore or the second bore extending into the junction; and
    a plunger disposed in one of the plurality of bores.

16. The fluid end of claim 15, wherein one or more of the plurality of bores includes a mating interface.

17. The fluid end of claim 15, further comprising a valve and a valve seat disposed in one of the plurality of bores.

18. The fluid end of claim 15, wherein at least one of the grooves comprises a first radius and a second radius surrounding an intermediate radius.

19. The fluid end of claim 18, wherein the intermediate radius is symmetrical relative to a centerline of the groove.

* * * * *